W. L. FRANKS.
ADJUSTABLE LIGHT OR OTHER FIXTURE.
APPLICATION FILED MAR. 16, 1910.
986,451.  Patented Mar. 14, 1911.
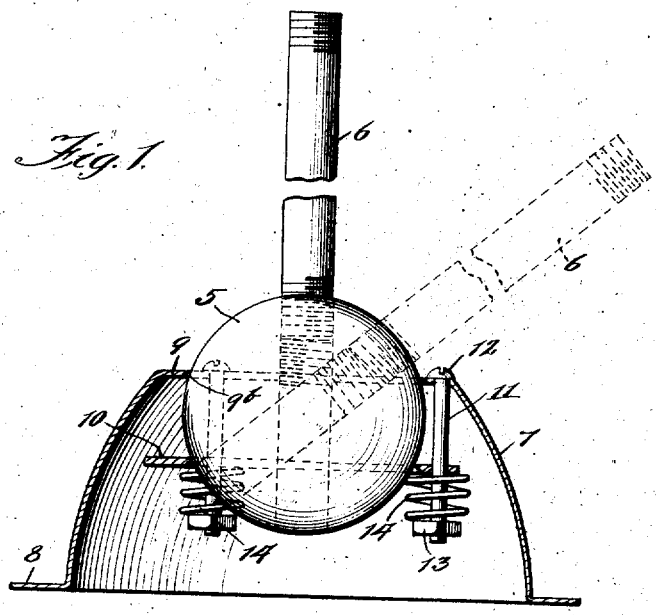
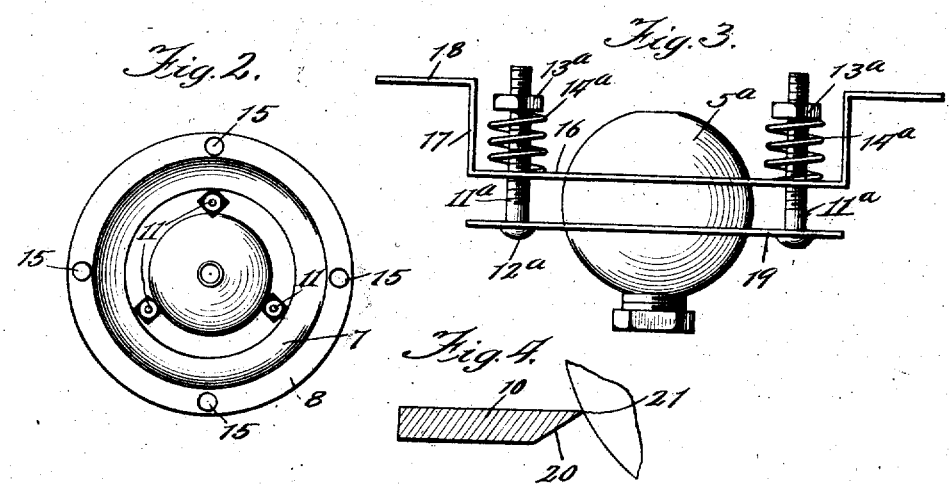
Witnesses:
Inventor:
William L. Franks

UNITED STATES PATENT OFFICE.

WILLIAM L. FRANKS, OF ROCK ISLAND, ILLINOIS.

ADJUSTABLE LIGHT OR OTHER FIXTURE.

986,451.  Specification of Letters Patent.  Patented Mar. 14, 1911.

Application filed March 16, 1910. Serial No. 549,774.

*To all whom it may concern:*

Be it known that I, WILLIAM L. FRANKS, a citizen of the United States of America, and resident of Rock Island, Rock Island county, Illinois, have invented a certain new and useful Improvement in Adjustable Light or other Fixtures, of which the following is a specification.

My invention relates to improvements in adjustable light or other fixtures, and has for its object the production of a device in which spring clamping means are used in combination with a ball to hold articles in any desired position.

A further object is the production of a device to take the place of the ordinary ball and socket joint.

A further object is the production of a device of simple construction, and one that is not liable to easily get out of order.

These and such other objects as may hereinafter appear are attained by my device, embodiments of which are illustrated in the accompanying drawings, in which—

Figure 1 represents a side elevation of my device, partly in section. Fig. 2 represents a reduced top plan view of Fig. 1. Fig. 3 represents a side elevation of a modified form of my device. Fig. 4 represents an enlarged detail of my device.

Like numerals of reference indicate like parts in the several figures of the drawing.

Referring now to the drawings: 5 represents a metal ball provided with a threaded bore in which is screwed a rod or support 6 adapted to support any desired article, such as an electric light, a shade or the like; 7 represents a bowl-shaped support or bracket provided with an out-turned flange 8 and having a circular opening in the center of its flat face of a slightly less diameter than that of the ball 5, leaving an inwardly projecting flange 9 surrounding the opening. One edge of this flange is cut away, leaving an acute angle with an acute apex. Below the flange 9 is a ring 10 having an opening conforming with that in the flat face of the support 7, the ring being held in the desired position by means of bolts 11, the heads 12 of which engage the flange ring 9, the bolts passing through holes in the lower ring and terminating in nuts 13 between which and the under side of the ring 10 are interposed springs 14, by means of which the ring is held against the outer periphery of the ball. The contacting edge of this plate is also preferably formed as a sharp edge.

The device may be fixed securely in place by means of screws passing through holes 15 in the lower flange; or if desired, the base itself may be weighted in order to prevent the device from tipping over when the position of the ball and member 6 is shifted.

In Fig. 3, I have shown a modification in which the upper plate 16 is bent upwardly at 17 and outwardly at 18. The plate is provided with an opening of less diameter than that of the ball 5ª, and may be held against a wall or ceiling by means of any suitable fasteners (not shown) through the portion 18. A lower plate or ring 19 is provided with an opening corresponding to that in the top plate, the edges of the two openings gripping the ball above and below its center. The lower plate is held in position by means of bolts 11ª having heads 12ª engaging the under side of the plate 19. Nuts 13ª are screwed on the upper ends of the bolts and springs 14ª are interposed between the nuts and the top plate 16.

In Fig. 4 I have shown a detail section of a ring 10 with one edge cut away at 20, leaving an acute angled inner edge with a sharpened apex 21. With the inner edges of the rings cut away in the manner described, the ball will be supported on practically a pair of parallel knife edges held spring-pressed against the outer surface of the ball, by which means a very firm support is obtained so that the ball can be securely held in any desired position without danger of slipping.

It will be noted that by regulating the tension of the springs 14—14ª by means of the nuts 13—13ª, the edges of the flanges may be caused to press against the surface of the ball with any desired force, the pressure, of course, being regulated by the weight of the article which is attached to or carried by the rod 6. By making the openings in the rings or plates only slightly smaller than the diameter of the ball, the ball is gripped near its center line, thus permitting a wide angular range of the rod 6; that is, the rod can be swung upwardly or downwardly in nearly a horizontal position without interfering with the plate or rings.

In the form shown in Fig. 1, practically the entire device is concealed within the case or shell 7, and is thus protected against dust or dampness and at the same time hiding all unsightly portions of the device.

My device may be used in connection with electric lights, telephone holders, book rests, adjustable trays for the sick-room, and dental offices, and for a multitude of purposes; in fact, in any place where an adjustable joint is required or desired to support a weight in angular positions.

It is, of course, understood that I do not limit myself to any particular shape or configuration or even to the continuous ring, as if it became desirable for any reason to cut away portions of the bearing edge of the rings it is only necessary to leave a sufficient number of points of attachment to retain the ball in position.

I prefer to use metal in the construction of the rings, but other material may be advantageously used.

I claim:

1. In a fixture for supporting electric lights or other fixtures, a pair of plates each having a circular opening therein, registering with each other, a ball seated within said openings, and spring means for holding said plates in contact with said ball, one of said plates provided with a sharp edge adapted to bear against said ball to hold it in any desired position.

2. In a fixture for supporting electric lights or other devices, a base or body adapted to be placed or mounted in position, having an opening in its outer end, a ball larger than said opening, seated therein, a plate having an opening smaller than the ball, in which the latter is also seated, spring means for keeping the ball clamped between the body and plate, whereby the ball is adapted to be rotated in the two openings, in any direction, which openings have sharp circular edges forming bearing surfaces that engage the ball to merely cause friction, and means for regulating the tension of said spring means, to cause the ball to be retained by friction in any desired position, without interfering with the free and easy rotary adjustment thereof.

Signed by me at Rock Island, Illinois, this 7th day of March 1910.

WILLIAM L. FRANKS.

Witnesses:
H. W. ANDREWS,
VERA ANDREWS.